(12) United States Patent
Kim

(10) Patent No.: US 10,108,281 B2
(45) Date of Patent: Oct. 23, 2018

(54) DISPLAY APPARATUS

(71) Applicant: Samsung Display Co., Ltd., Yongin-si, Gyeonggi-Do (KR)

(72) Inventor: Sungkook Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 219 days.

(21) Appl. No.: 14/742,488

(22) Filed: Jun. 17, 2015

(65) Prior Publication Data

US 2016/0077642 A1 Mar. 17, 2016

(30) Foreign Application Priority Data

Sep. 15, 2014 (KR) .................. 10-2014-0122048

(51) Int. Cl.
G06F 3/041 (2006.01)
G02F 1/1333 (2006.01)
G06F 3/044 (2006.01)

(52) U.S. Cl.
CPC ........ G06F 3/0412 (2013.01); G02F 1/13338 (2013.01); G06F 3/044 (2013.01); G06F 3/0416 (2013.01); G06F 2203/04103 (2013.01); G06F 2203/04111 (2013.01)

(58) Field of Classification Search
None
See application file for complete search history.

(56) References Cited

U.S. PATENT DOCUMENTS

| 5,734,458 | A  | * | 3/1998 | Ikubo | G02F 1/13452 257/692 |
| 6,690,032 | B1 | * | 2/2004 | Umetsu | G02F 1/1345 257/621 |
| 9,793,330 | B2 | * | 10/2017 | Li | H01L 25/167 |
| 9,835,918 | B2 | * | 12/2017 | Jung | G02F 1/136286 |
| 2012/0061017 | A1 | | 3/2012 | Yoo et al. | |
| 2013/0002583 | A1 | | 1/2013 | Jin et al. | |
| 2013/0234973 | A1 | | 9/2013 | Kim et al. | |
| 2013/0286462 | A1 | | 10/2013 | Yeo et al. | |
| 2013/0300678 | A1 | | 11/2013 | Kang et al. | |
| 2013/0342779 | A1 | * | 12/2013 | Jung | G02B 6/0083 349/43 |

(Continued)

FOREIGN PATENT DOCUMENTS

KR 10-2012-0027997 A 3/2012
KR 10-2012-0056033 A 6/2012

(Continued)

*Primary Examiner* — Patrick Moon
(74) *Attorney, Agent, or Firm* — H.C. Park & Associates, PLC

(57) ABSTRACT

A display apparatus is provided. The display apparatus includes: a display panel comprising one or more display devices which generate visible light; a display circuit film portion that is disposed such that the display circuit film portion overlaps the one or more display devices and faces a surface of the display panel, which is opposite to a surface of the display panel, on which the visible rays are realized on a user side, and comprises a base film portion and one or more conductive patterns contacting the base film portion and a first conductive connecting member that is disposed in a first via-area to connect the one or more conductive patterns of the display circuit film portion and the one or more display devices.

16 Claims, 6 Drawing Sheets

(56) References Cited

U.S. PATENT DOCUMENTS

| | | | |
|---|---|---|---|
| 2014/0062916 A1* | 3/2014 | Hong | G06F 3/041 |
| | | | 345/173 |
| 2014/0063393 A1 | 3/2014 | Zhong et al. | |
| 2014/0091331 A1* | 4/2014 | Ning | H01L 27/1288 |
| | | | 257/88 |
| 2014/0191771 A1* | 7/2014 | Nam | G06F 3/041 |
| | | | 324/691 |
| 2015/0243681 A1* | 8/2015 | Sung | H01L 27/1288 |
| | | | 257/72 |
| 2016/0064413 A1* | 3/2016 | Cai | H01L 27/124 |
| | | | 257/774 |
| 2016/0079278 A1* | 3/2016 | Wei | H01L 27/1248 |
| | | | 257/72 |
| 2016/0202587 A1* | 7/2016 | Jung | G02B 6/0083 |
| | | | 349/43 |
| 2016/0253967 A1* | 9/2016 | Gai | H01L 27/3276 |
| | | | 345/206 |
| 2016/0276375 A1* | 9/2016 | Sung | H01L 27/1288 |
| 2016/0336532 A1* | 11/2016 | Li | H01L 25/167 |
| 2016/0342053 A1* | 11/2016 | Jiang | H01L 21/77 |
| 2016/0379996 A1* | 12/2016 | Ma | H01L 27/124 |
| | | | 257/72 |
| 2017/0031223 A1* | 2/2017 | Xue | G02F 1/13454 |
| 2017/0032735 A1* | 2/2017 | Lee | G09G 3/3225 |

FOREIGN PATENT DOCUMENTS

| | | |
|---|---|---|
| KR | 10-2013-0004085 A | 1/2013 |
| KR | 10-2013-0126007 A | 11/2013 |
| KR | 10-2014-0029196 A | 3/2014 |

\* cited by examiner

DISPLAY APPARATUS

CLAIM OF PRIORITY

This application makes reference to, incorporates the same herein, and claims all benefits accruing under 35 U.S.C. § 119 from an application earlier filed in the Korean Intellectual Property Office on 15 Sep. 2014 and there duly assigned Serial No. 10-2014-0122048.

BACKGROUND OF THE INVENTION

1. Field of Disclosure

One or more exemplary embodiments relate to a display apparatus.

2. Description of the Related Art

Recently, display apparatuses have been used in diverse fields. Particularly, display apparatuses have been made thin and light, and thus, the scope of using the display apparatuses has become even wider. Display apparatuses are self-emitting type display apparatuses that have excellent characteristics in power consumption and viewing angles or image quality.

The display apparatuses include a display panel having a display area for realizing an image on a user side. The display area of the display panel includes one or more display devices.

It is required to enlarge the display area of the display apparatuses for the improvement in image quality and the application of the display apparatuses into various fields.

The above information disclosed in this Related Art section is only for enhancement of understanding of the background of the invention and therefore it may contain information that does not form the prior art that is already known to a person of ordinary skill in the art.

SUMMARY OF THE INVENTION

One or more exemplary embodiments include a display apparatus that may improve image quality.

Additional aspects will be set forth in part in the description which follows and, in part, will be apparent from the description, or may be learned by practice of the presented embodiments.

According to one or more exemplary embodiments, a display apparatus includes: a display panel including one or more display devices which generate visible light; a display circuit film portion that is disposed such that the display circuit film portion overlaps the one or more display devices and faces a surface of the display panel, which is opposite to a surface of the display panel, on which the visible rays are realized on a user side, and includes a base film portion and one or more conductive patterns contacting the base film portion; and a first conductive connecting member that is disposed in a first via-area to connect the one or more conductive patterns of the display circuit film portion and the one or more display devices.

The one or more conductive patterns may be circuit patterns for driving the one or more display devices or a routing line corresponding to a conductor included in the one or more display devices.

The one or more conductive patterns may be formed on a surface of the base film portion of the display circuit film portion, the surface of the base film portion of the display circuit film portion facing the display panel.

The first via-area may be formed in the display panel.

The display panel may include a substrate. The one or more display devices may be formed on the substrate. The first via-area may be formed such that the first via penetrates the substrate.

The first via-area may be formed such that the first via-area penetrates the base film portion of the display circuit film portion.

The first via-area may be formed such that the first via-area has a length corresponding to a partial thickness of the base film portion of the display circuit film portion.

The one or more conductive patterns may be disposed in the base film portion.

The display apparatus may further include a touch panel that is disposed above the display panel and includes a touch pattern for detecting a touch input from a user.

The display apparatus may further include a touch circuit film portion that is disposed between the touch panel and the display panel, overlaps the touch pattern, and includes a base film portion and one or more conductive patterns contacting the base film portion; and a second conductive connecting member that is disposed in a second via-area to connect the one or more conductive patterns of the touch circuit film portion and the touch pattern.

The one or more conductive patterns of the touch circuit film portion may be circuit patterns for driving the touch panel or a routing line corresponding to the touch pattern.

The one or more conductive patterns of the touch circuit film portion may be formed on a surface of the base film portion of the touch circuit film portion, the surface of the base film portion of the touch circuit film portion facing the display panel.

The second via-area may be formed in the touch panel.

The touch panel may include a touch substrate. The touch pattern may be formed on the touch substrate. The second via-area may be formed such that the second via-area penetrates the touch substrate.

The second via-area may be formed such that the second via-area penetrates the base film portion of the touch circuit film portion.

The second via-area may be formed such that the second via-area has a length corresponding to a partial thickness of the base film portion of the touch circuit film portion.

The one or more conductive patterns of the touch circuit film portion may be disposed in the base film portion of the touch circuit film portion.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
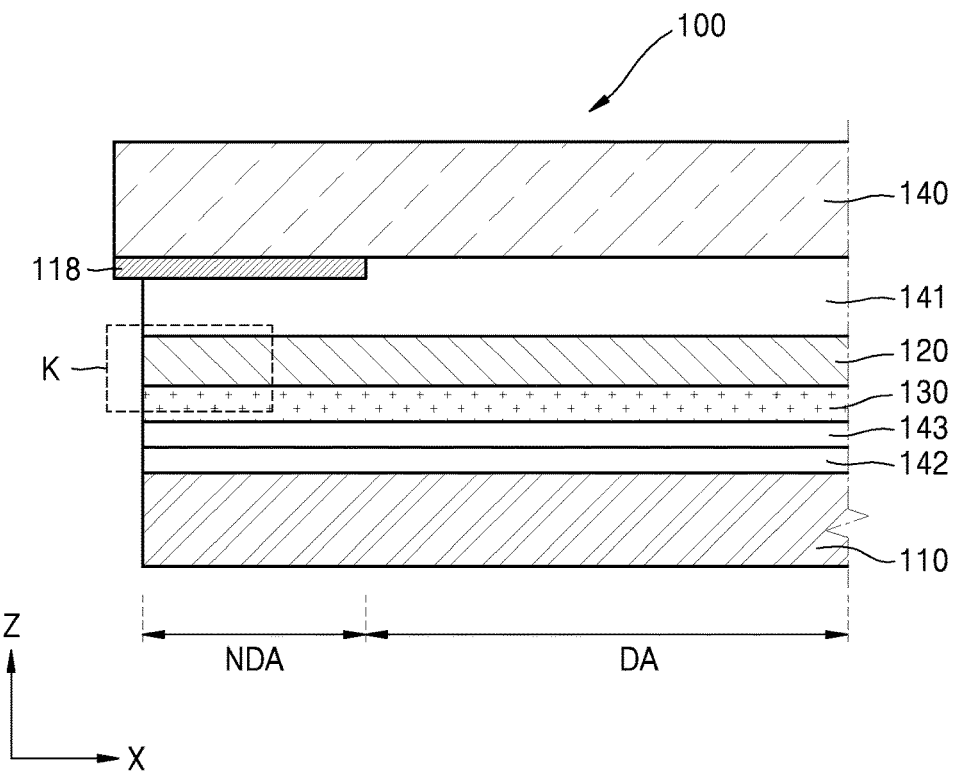
FIG. 1 is a cross-sectional view of a display apparatus according to an embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

It will be understood that although the terms "first," "second," etc. may be used herein to describe various components, these components should not be limited by these terms. These components are only used to distinguish one component from another.

As used herein, the singular forms "a," "an," and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or component is referred to as being "formed on," another layer, region, or component, it can be directly or indirectly formed on the other layer, region, or component. That is, for example, intervening layers, regions, or components may be present.

Sizes of elements in the drawings may be exaggerated for convenience of explanation. In other words, since sizes and thicknesses of components in the drawings are arbitrarily illustrated for convenience of explanation, the following embodiments are not limited thereto.

In the following examples, the x-axis, the y-axis, and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

When a certain embodiment may be implemented differently, a specific process order may be performed differently from the described order. For example, two consecutively described processes may be performed substantially at the same time or performed in an order opposite to the described order.

Hereinafter, embodiments will be described in detail by referring to accompanying drawings, wherein like reference numerals refer to like elements throughout and repeated descriptions will be omitted.

Figure 2:
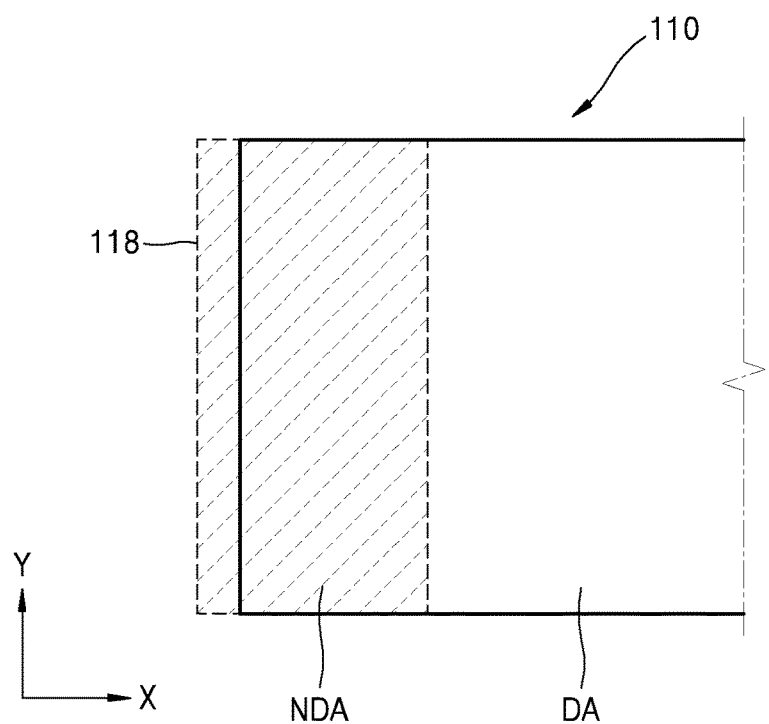
FIG. 2 is a plan view taken from a direction of FIG. 1.
Figure 3:
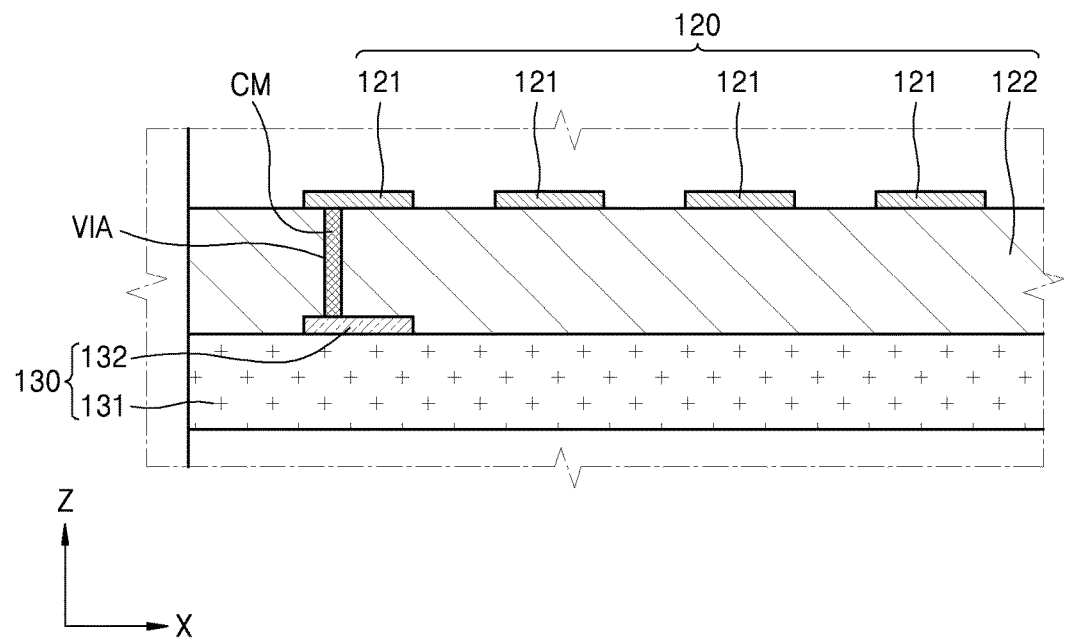
FIG. 3 is an enlarged view of area K of FIG. 1.

FIG. 1 is a cross-sectional view of a display apparatus 100 according to an embodiment. FIG. 2 is a plan view taken from a direction of FIG. 1. FIG. 3 is an enlarged view of K of FIG. 1.

Referring to FIGS. 1 through 3, the display apparatus 100 includes a display panel 110, a touch panel 120, a touch circuit film portion 130, and a conductive connecting member CM.

The touch circuit film portion 130 may include a routing line or a circuit pattern connected with one or more touch patterns disposed in the touch panel 120. Aspects regarding this will be described in detail later.

The display panel 110 may include one or more display devices for realizing an image on a user side. For example, the display panel 110 may include display devices, such as an organic light-emitting device or a liquid crystal display device. The display panel 110 may include various other display devices.

In detail, the display panel 110 may include a display area DA and a non-display area NDA. The display area DA may include one or more display devices. The non-display area NDA may include one or more circuit patterns (not shown) for driving the display area DA.

Referring to FIG. 2, the display area DA may be formed in a portion of the display panel 110, and the non-display area NDA may be formed at a side of the display area DA to be proximate to the display area DA.

In some embodiments, the non-display area NDA may be formed to encircle the display area DA.

In some embodiments, a black matrix 118 may be formed to overlap at least the non-display area NDA.

The display panel 110 may be formed in various shapes. For example, the display panel 110 may be formed such that the display panel 110 has one or more display devices (not shown) disposed between a substrate (not shown) and an encapsulating member (not shown).

Here, the substrate may be formed of various materials, for example, a glass material, a plastic material, or a metal material. The encapsulating member is disposed to face the substrate and the encapsulating member may be formed of a glass material, a plastic material, or a metal material. Also, in other embodiments, the encapsulating member may include at least one organic layer or at least one inorganic layer.

The touch panel 120 is disposed on the display panel 110. The touch circuit film portion 130 is disposed between the display panel 110 and the touch panel 120. The touch panel 120 includes one or more touch patterns 121 as illustrated in FIG. 3.

In some embodiments, the touch panel 120 includes a touch substrate 122 and a touch pattern 121 formed on the touch substrate 122. The touch substrate 122 may be formed of various materials. For example, the touch substrate 122 may be formed of at least one of the materials forming the substrate (not shown) and the encapsulating member (not shown) of the display panel 110 described above.

The display apparatus 100 which may sense a user's touch via the touch panel 120 including the one or more touch patterns 121 may be easily formed.

The touch circuit film portion 130 is disposed between the touch panel 120 and the display panel 110. The touch circuit film portion 130 includes a base film portion 131 and one or more conductive patterns 132 disposed on a surface of the base film portion 131. That is, although one conductive pattern 132 is illustrated in FIG. 3, two or more conductive patterns 132 may be formed.

The conductive pattern 132 may be a routing line corresponding to the one or more touch patterns 121 of the touch panel 120. That is, the touch panel 120 includes one or more conductive patterns 132 and the one or more conductive patterns 132 are connected to a circuit portion (not shown) for driving the touch panel 120. Here, the one or more conductive patterns 132 may route the one or more touch patterns 121 to connect the one or more touch patterns 121 to the circuit portion.

Also, in some embodiments, the one or more conductive patterns 132 may be a circuit pattern of the circuit portion for driving the touch panel 120.

The conductive connecting member CM may connect the one or more touch patterns 121 and the one or more conductive patterns 132. The conductive connecting member CM is disposed for an electrical connection between the touch pattern 121 and the conductive pattern 132, and may be formed of various materials. The conductive connecting member CM may be formed of a material having a high electrical conductivity, such as a metal material.

The conductive connecting member CM is disposed in a via-area VIA. The via-area VIA is formed on the touch substrate 122. In detail, the via-area VIA is formed to penetrate to the touch substrate 122. Also, the via-area VIA is formed to overlap at least the touch pattern 121 and the conductive pattern 132 so that the conductive connecting member CM disposed in the via-area VIA may easily connect the touch pattern 121 and the conductive pattern 132 electrically.

For the above aspect, the one or more conductive patterns 132 of the touch circuit film portion 130 may be formed on an upper surface of the base film portion 131, that is, the surface facing the touch panel 120.

The configuration of the touch panel 120 and the touch circuit film portion 130 may vary, which will be apparent in reference to FIGS. 4 through 7. FIGS. 4 through 7 are views of variation examples of FIG. 3. For convenience of explanation, only aspects different from those in the above described embodiment will be explained.

Figure 4:
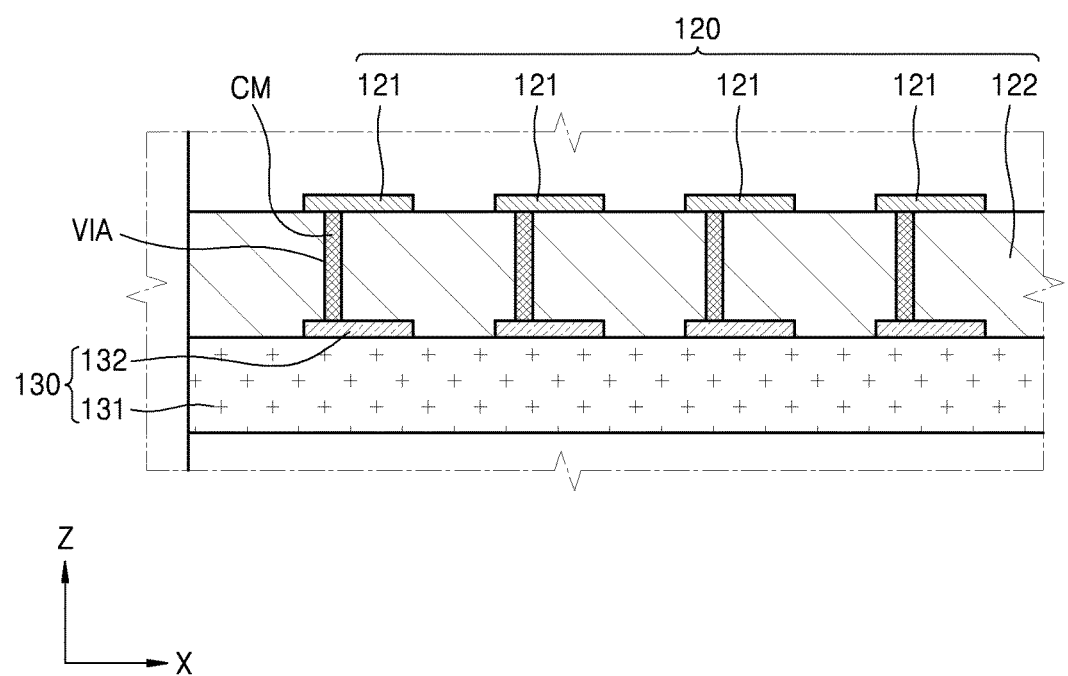
FIGS. 4 through 7 are views of variation examples of FIG. 3.

Referring to FIG. 4, the touch circuit film portion 130 includes the base film portion 131 and a plurality of conductive patterns 132 disposed on a surface of the base film portion 131.

The conductive patterns 132 may be routing lines corresponding to the one or more touch patterns 121 of the touch panel 120. Also, the conductive patterns 132 may be a circuit pattern of a circuit portion (not shown) for driving the touch panel 120.

A plurality of conductive connecting members CMs may be included to connect the one or more touch patterns 121 and the plurality of conductive patterns 132.

The conductive connecting members CMs are disposed in the via-area VIA. The via-area VIA is formed on the touch substrate 122. In detail, a plurality of via-areas VIAs are formed to penetrate the touch substrate 122. Also, each of the plurality of via-areas VIAs is formed to overlap at least the touch pattern 121 and the conductive pattern 132.

Figure 5:
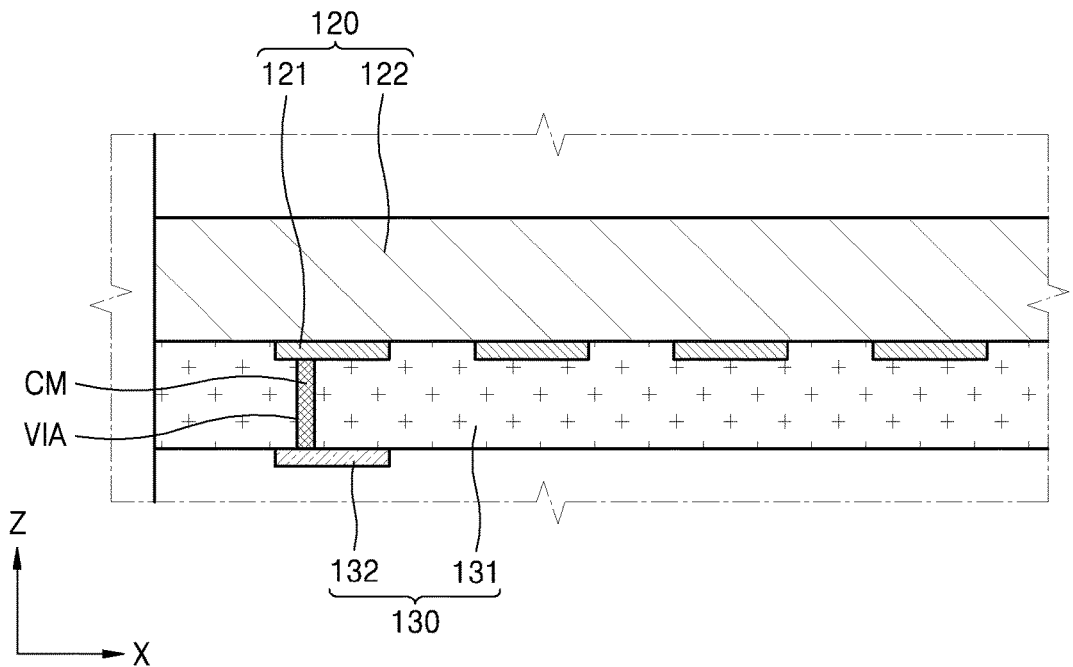

Referring to FIG. 5, the touch panel 120 includes the touch substrate 122 and the touch pattern 121. The touch pattern 121 is formed on a bottom surface of the touch substrate 122, that is, the surface facing the touch circuit film portion 130.

The touch circuit film portion 130 includes the base film portion 131 and the one or more conductive patterns 132 disposed on a surface of the base film portion 131. In detail, the conductive pattern 132 is formed on the surface of the base film portion 131, which faces the display panel 110, that is, the surface opposite to the surface facing the touch panel 120.

Figure 6:
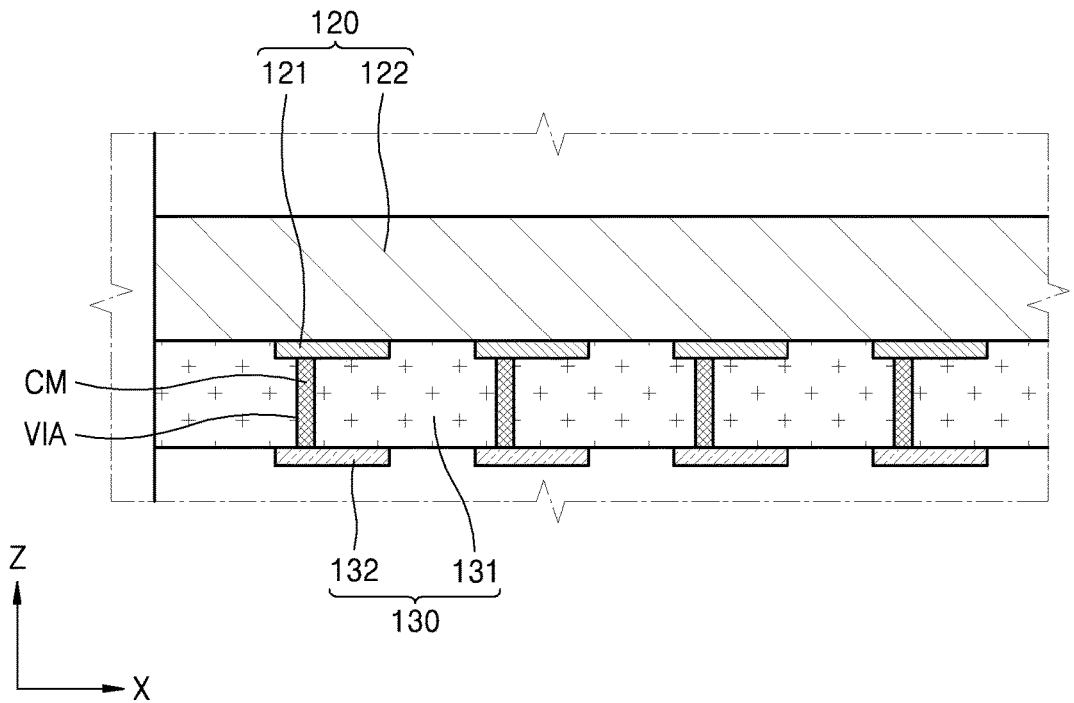

Also, as illustrated in FIG. 6, a plurality of conductive patterns 132 may be formed on a surface of the base film portion 131.

The conductive patterns 132 may be routing lines corresponding to the one or more touch patterns 121 of the touch panel 120. Also, the conductive patterns 132 may be circuit patterns of a circuit portion (not shown) for driving the touch panel 120.

The conductive connecting member CM is formed to connect the touch pattern 121 and the conductive pattern 123. As illustrated in FIG. 6, a plurality of conductive connecting members CMs may be included to connect the one or more touch patterns 121 and the plurality of conductive patterns 132.

The conductive connecting members CMs are disposed in the via-area VIA. The via-area VIA is formed on the base film portion 131 of the touch circuit film portion 130. In detail, the via-area VIA is formed to penetrate the base film portion 131. Also, a plurality of via-areas VIAs may be formed to penetrate the base film portion 131, as illustrated in FIG. 6.

Each of the plurality of via-areas VIAs is formed to overlap at least the touch pattern 121 and the conductive pattern 132.

Figure 7:
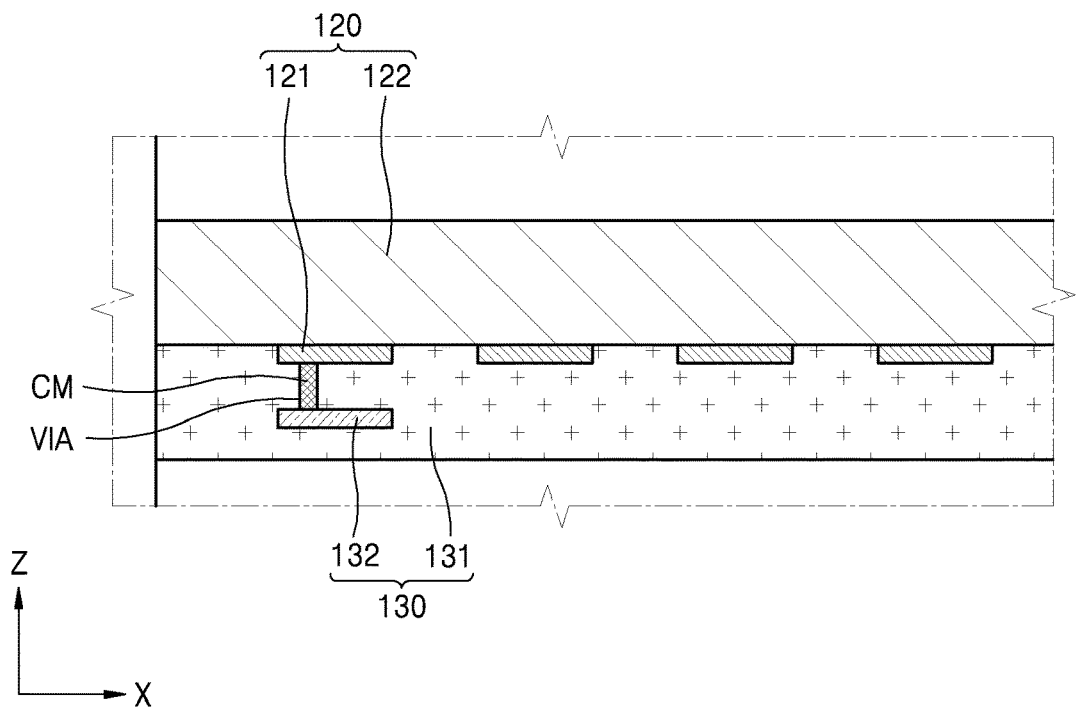

Referring to FIG. 7, the touch panel 120 includes the touch substrate 122 and the one or more touch patterns 121. The one or more touch patterns 121 are formed on the bottom surface of the touch substrate 122, that is, the surface facing the touch circuit film portion 130.

The touch circuit film portion 130 includes the base film portion 131 and the conductive pattern 132 disposed in the base film portion 131. That is, the conductive pattern 132 may be formed to be covered by the base film portion 131. Also, although not illustrated, a plurality of conductive patterns 132 may be formed in the base film portion 131.

The conductive pattern 132 may be a routing line corresponding to the touch pattern 121 of the touch panel 120. Also, the conductive pattern 132 may be a circuit pattern of circuit portion (not shown) for driving the touch panel 120.

The conductive connecting member CM is formed to connect the touch pattern 121 and the conductive pattern 123. As illustrated in FIG. 7, a plurality of conductive connecting members CMs may be included to connect the one or more touch patterns 121 and the plurality of conductive patterns 132, as illustrated in FIG. 7.

The conductive connecting member CM is disposed in the via-area VIA. The via-area VIA is formed on the base film portion 131 of the touch circuit film portion 130. In detail, the via-area VIA is formed to correspond to a predetermined thickness of the base film portion 131. Also, a plurality of via-areas VIAs may be formed.

Each of the plurality of via-areas VIAs is formed to overlap at least the touch pattern 121 and the conductive pattern 132.

In some embodiments, a covering member 140 may be disposed above the touch panel 120, that is, the covering member 140 may be disposed to face a surface of the touch panel 120, which is opposite to a surface of the touch panel 120, which faces the display panel 110. The covering member 140 prevents the touch panel 120 and the display panel 110 from being damaged by shocks and improves the durability of the touch panel 120 and the display panel 110. The covering member 140 may be formed of various materials. For example, the covering member 140 may be formed of a glass material or a plastic material.

In some embodiments, the covering member 140 may be formed of a light transmittance material for a light realized in the display panel 110 to be transmitted to a user side via the covering member 140.

In some embodiments, a first bonding member 141 may be disposed between the covering member 140 and the touch panel 120. The first bonding member 141 may be formed to bond the covering member 140 and the touch panel 120. For example, the first bonding member 140 may include various bonding materials. In some embodiments, the first bonding member 141 may include an organic material, for example, a resin-based bonding material. Also, the first bonding material 141 may be formed of an optical polymer material having a high light transmittance.

As described above, the black matrix 118 may be disposed to overlap the non-display area NDA of the display panel 110. In detail, the black matrix 118 may be disposed between the first bonding member 141 and the covering member 140.

In some embodiments, a polarized light member 142 may be further disposed between the display panel 110 and the touch circuit film portion 130. The polarized light member 142 may improve characteristics of visible rays realized in the display panel 110, convert light realized in the display panel 110 so as to be recognizable by a user, or prevent or reduce the reflection of external light in the display panel 110, thereby improving image quality of the display apparatus 100.

In some embodiments, a second bonding member 143 may be disposed between the polarized light member 142 and the touch circuit film portion 130. The second bonding member 143 may be formed to bond the polarized light member 142 and the touch circuit film portion 130. For example, the second bonding member 143 may include various bonding materials. In some embodiments, the second bonding member 143 may include an organic material, for example, a resin-based bonding material. Also, the second bonding member 143 may be formed of an optical polymer material having a high light transmittance.

The display apparatus 100 according to the present embodiment includes the display panel 110, the touch panel 120, the touch circuit film portion 130, and the conductive connecting member CM. The touch panel 120 includes the one or more touch patterns 121. The touch circuit film portion 130 includes the one or more conductive patterns 132 corresponding to the routing line for the one or more touch patterns 121 or to the circuit pattern of the circuit portion for driving the touch panel 120.

Also, the conductive connecting member CM is formed in the via-area VIA overlapping the conductive pattern 132 and the touch pattern 121, to electrically connect the touch pattern 121 and the conductive pattern 132.

Accordingly, the routing line or the circuit pattern corresponding to the touch pattern 121 of the touch panel 120 may be easily formed. In particular, the touch circuit film portion 130 is disposed below the touch panel 120, that is, the touch circuit film portion 130 is disposed on a surface of the touch panel 120, which is not a surface on which the touch pattern 121 is formed. Also, the conductive pattern 132 may be formed in the touch circuit film portion 130 to overlap the touch pattern 121. Therefore, effective areas for the touch pattern 121 may be increased in the touch panel 120 and the dead space on the touch panel 120 may be minimized.

Accordingly, there may be no need to form an additional black matrix for the touch panel 120 or an area of the black matrix for the touch panel 120 may be minimized.

Accordingly, the precision of a touch function of the touch panel 120 of the display apparatus 100 may be improved. Also, light prevention and intervention through the additional black matrix for the touch panel 120 may be minimized, thereby improving image quality of the display apparatus 100.

Figure 8:
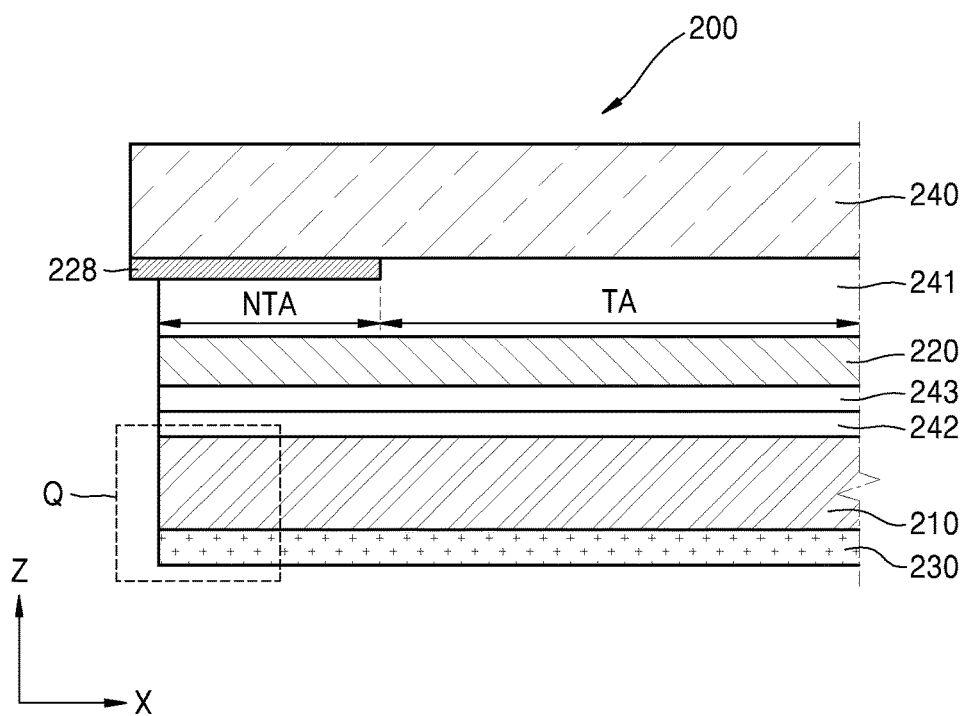
FIG. 8 is a cross-sectional view of a display apparatus according to another embodiment.
Figure 9:
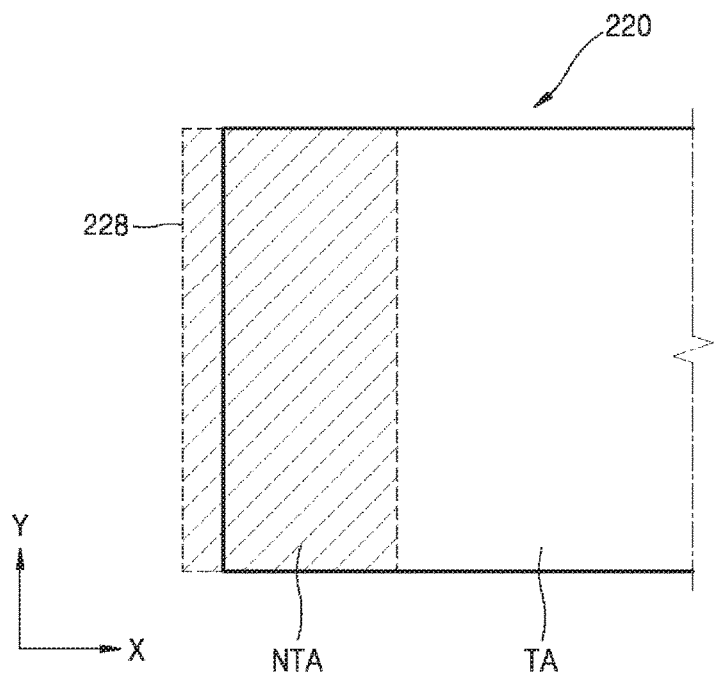
FIG. 9 is a plan view taken from a direction of FIG. 8.
Figure 10:
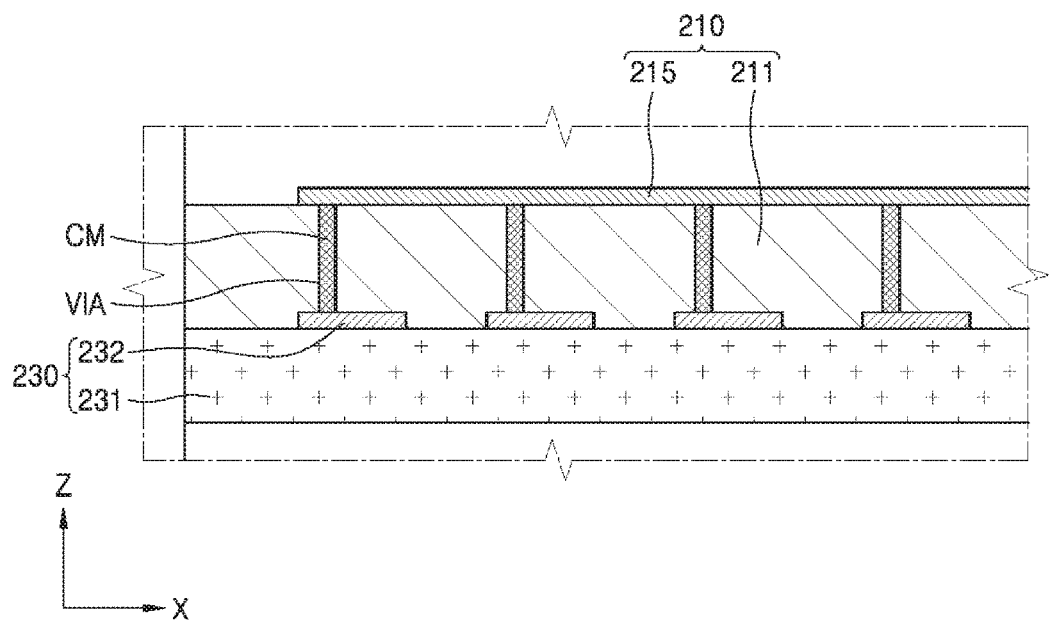
FIG. 10 is an enlarged view of area Q of FIG. 8.

FIG. 8 is a cross-sectional view of a display apparatus 200 according to another embodiment. FIG. 9 is a plan view taken from a direction of FIG. 8. FIG. 10 is an enlarged view of Q of FIG. 8.

Referring to FIGS. 8 through 10, the display apparatus 200 includes a display panel 210, a touch panel 220, a display circuit film portion 230, and the conductive connecting member CM.

The touch panel 220 is for increasing convenience of the display apparatus 200 and is not an essential element, and thus, the touch panel 220 may be omitted in the present embodiment.

When the touch panel 220 is omitted, a black matrix 228 may be omitted.

The display circuit film portion 230 may include a routing line or a circuit pattern connected with one or more lines disposed on the display panel 210. Aspects regarding this will be described in detail later.

The display panel 210 may include one or more display devices 215 for realizing an image on a user side. For example, the display panel 210 may include a substrate 211 and the display device 215 formed on the substrate 211, such as an organic light-emitting device or a liquid crystal display device. The display panel 210 may include various other display devices.

In detail, the display panel 210 may include a display area (not shown) on the substrate 211 and the one or more display devices 215 may be disposed in the display area. The display panel 210 according to the present embodiment may generally include the display area and may not include a non-display area. Also, even though the display panel 210 includes the non-display area, the display panel 210 may include the non-display area of a very small area.

The display device 215 includes one or more conductors, for example, lines or electrodes. Types of the display device 215 may vary. When the display device 215 may be an organic light-emitting device, the display device 215 may include a first electrode, a second electrode, and an emission layer disposed therebetween.

The display panel 210 may be formed in various shapes. For example, the display panel 210 may be formed such that the display panel 210 has one or more display devices (not shown) disposed between a substrate (not shown) and an encapsulating member (not shown).

Here, the substrate may be formed of various materials, for example, a glass material, a plastic material, or a metal material. The encapsulating member may be disposed to face the substrate and the encapsulating member may be formed of a glass material, a plastic material, or a metal material. Also, in other embodiments, the encapsulating member may include at least one organic layer or at least one inorganic layer.

The touch panel 220 may be disposed on the display panel 210. Although not illustrated, in some embodiments, the touch panel 220 includes a touch substrate (not shown) and a touch pattern (not shown) formed on the touch substrate.

Referring to FIG. 9, a touch recognition area TA may be formed in a portion of the touch panel 220, and a non-touch recognition area NTA (i.e., an area in which touch inputs are not recognized) may be formed at a side of the touch recognition area TA to be adjacent to the touch recognition area TA.

In some embodiments, the non-touch recognition area NTA may be formed to encircle the touch recognition area TA. A touch pattern (not shown) may be formed in the touch recognition area TA. Also, a routing line (not shown) corresponding to the touch pattern or patterns (not shown) included in the circuit portion for driving the touch pattern 220 may be formed in the non-touch recognition area NTA.

In some embodiments, the black matrix 228 may be formed to overlap at least the non-touch recognition area NTA. The black matrix 228 may block the non-touch recognition area NTA so as to prevent or reduce light intervention due to the non-touch recognition area NTA. In particular, the black matrix 228 may prevent or reduce discoloration or contamination of visible rays realized in the display panel 210.

That is, when the display apparatus 200 does not include the touch panel 220, according to some embodiments, the display apparatus 200 may not need the black matrix 228.

The display apparatus 200 which may detect a user's touch via the touch panel 220 may be easily formed.

The display circuit film portion 230 may be disposed on a bottom surface of the display panel 210, that is, the surface opposite to a surface of the display panel 210, which faces a user. The display circuit film portion 230 includes a base film portion 231 and one or more conductive patterns 232 disposed on a surface of the base film portion 231. That is, although two conductive patterns 232 are illustrated in FIG. 10, one conductive pattern 232 or three or more conductive patterns 232 may be formed. Also, although it is illustrated in FIG. 10 that the conductive pattern 232 may be disposed in a portion which is similar to a groove, formed on a surface of the base film portion 231, the groove is not needed to be formed on the surface of the base film portion 231 and the conductive pattern 232 may be directly formed on the surface of the base film portion 231.

The conductive pattern 232 may be one of various conductors included in the display device 215 of the display panel 210, for example, a routing line corresponding to lines. Also, in some embodiments, the conductive pattern 232 may be a circuit pattern for driving the display panel 210. The conductive pattern 232 may be electrically connected with the display device 215 of the display panel 210. In detail, the conductive pattern 232 may be disposed to be electrically connected with the conductors of the display device 215, such as electrodes or lines.

The conductive connecting member CM may connect the display device 215 and the conductive pattern 232. The conductive connecting member CM may be disposed to electrically connect the display device 215 and the conductive pattern 232. The conductive connecting member CM may be formed of various materials. The conductive connecting member CM may be formed of a material having a high electrical conductivity, such as a metal material.

The conductive connecting member CM may be disposed in the via-area VIA. The via-area VIA may be formed on the substrate 211 of the display panel 210. In detail, the via-area VIA may be formed to penetrate to the substrate 211. Also, the via-area VIA may be formed to overlap at least the display device 215, in particular, to overlap a conductor (not shown) and the conductive pattern 232 included in the display device 215 so that the conductive connecting member CM disposed in the via-area VIA may easily connect the conductor of the display device 215 and the conductive pattern 232 electrically.

To this end, the conductive pattern 232 of the display circuit film portion 230 may be formed on an upper surface of the base film portion 231, that is, the surface which faces the display panel 210.

Also, the present embodiment may apply the structures of the above described embodiment, that is, the structures of FIGS. 4 through 7.

That is, the number of the via-areas VIAs may be one and each of the number of the conductive connecting members CMs and the number of the conductive patterns 132 may be one to correspond thereto.

Also, the via-area VIA may penetrate the base film portion 231 of the display circuit film portion 230 or may be formed to correspond to a predetermined thickness of the base film portion 231. Also, the conductive pattern 232 may be formed on a bottom surface of the base film portion 231 or in the base film portion 231. In this case, the display device 215 of the display panel 210 may be formed below the substrate 211. Also, according to another embodiment, the via-area VIA may be formed such that the via-area VIA extends from each of the substrate 211 and the base film portion 231 so as to correspond to the display device 215.

In some embodiments, a covering member 240 may be disposed above the touch panel 220, that is, the covering member 240 may be disposed to face a surface of the touch panel 220, which is opposite to a surface of the touch panel 220, which faces the display panel 210. The covering member 240 prevents the touch panel 220 and the display panel 210 from being damaged by shocks and improves the durability of the touch panel 220 and the display panel 210. The covering member 240 may be formed of various materials. For example, the covering member 240 may be formed of a glass material or a plastic material.

In some embodiments, the covering member 240 may be formed of a light transmittance material for a light realized in the display panel 210 to be transmitted to a user side via the covering member 240.

In some embodiments, a first bonding member 241 may be disposed between the covering member 240 and the touch panel 220. The first bonding member 241 may be formed to bond the covering member 240 and the touch panel 220. For example, the first bonding member 240 may include various bonding materials. In some embodiments, the first bonding member 241 may include an organic material, for example, a resin-based bonding material. Also, the first bonding material 241 may be formed of an optical polymer material having a high light transmittance.

As described above, the black matrix 218 may be disposed to overlap the non-touch recognition area NTA. In detail, the black matrix 218 may be disposed between the first bonding member 241 and the covering member 240.

In some embodiments, a polarized light member 242 may be further disposed between the display panel 210 and the touch panel 220. The polarized light member 242 may improve characteristics of visible rays realized in the display panel 210, convert light realized in the display panel 210 so as to be recognizable by a user, or prevent or reduce the reflection of external light in the display panel 210, thereby improving image quality of the display apparatus 200.

In some embodiments, a second bonding member 243 may be disposed between the polarized light member 242 and the touch panel 220. The second bonding member 243 may be formed to bond the polarized light member 242 and the touch panel 220. For example, the second bonding member 243 may include various bonding materials. In some embodiments, the second bonding member 243 may include an organic material, for example, a resin-based bonding material. Also, the second bonding member 243 may be formed of an optical polymer material having a high light transmittance.

The display apparatus 200 according to the present embodiment includes the display panel 210, the display circuit film portion 230, and the conductive connecting member CM. The display circuit film portion 230 includes the one or more conductive patterns 232 corresponding to the routing line for the display device 215, in particular a conductor of the display device 215, or corresponding to the circuit pattern of the circuit portion for driving the display device 215.

Also, the conductive connecting member CM may be formed in the via-area VIA overlapping the conductive pattern 232 and the display device 215, to electrically connect the conductive pattern 232 and the conductor of the display device 215.

Accordingly, the routing line for the conductor of the display device 215 or the circuit pattern for driving the display device 215 may be easily formed. In particular, when visible rays are emitted in the display panel 210 to a user side, that is, toward an upper portion of FIG. 8, the display circuit film portion 230 may be disposed below the display panel 210, that is, on a surface of the display panel 210, which is not a surface facing a user, and the conductive pattern 232 may be formed in the display circuit film portion 230 to overlap the conductor of the display device 215. Accordingly, display areas of the display panel 210 for the display device 215 may be increased and the dead space on the display panel 210 may be minimized.

Accordingly, there may be no need to form an additional black matrix for the display panel 210 or an area of the black matrix for the display panel 210 may be minimized.

Accordingly, the display area of the display apparatus 200 may be increased, thereby improving image quality of the display apparatus 200.

Figure 11:
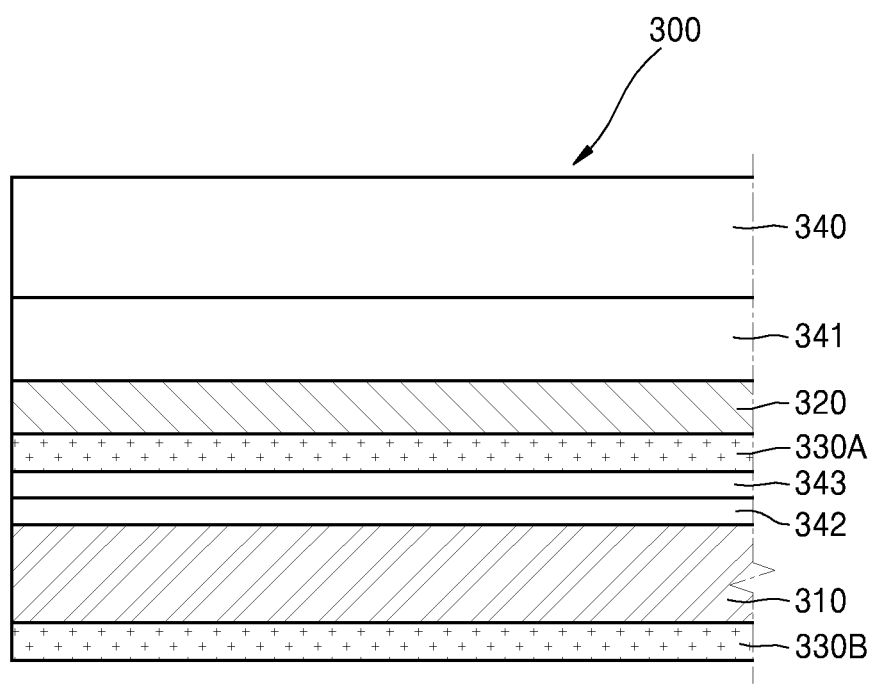
FIG. 11 is a cross-sectional view of a display apparatus according to another embodiment.

FIG. 11 is a cross-sectional view of a display apparatus 300 according to another embodiment.

Referring to FIG. 11, the display apparatus 300 includes a display panel 310, a touch panel 320, a touch circuit film portion 330A, a display circuit film portion 330B, and a conductive connecting member (not shown). For convenience of explanation, only aspects different from those in the above described embodiments will be described.

The display panel 310 may include one or more display devices (not shown) for realizing an image on a user side. That is, the display panel 310 may have a structure the same as or similar to that of the display panel 210 illustrated in FIGS. 8 through 10.

The touch panel 320 may be disposed on the display panel 310. Although not illustrated, in some embodiments, the touch panel 320 includes a touch substrate (not shown) and a touch pattern (not shown) formed on the touch substrate. Detailed aspects are the same as or similar to the aspects of the touch panel 120 illustrated in FIGS. 1 through 7, and thus, their descriptions will be omitted.

The display apparatus 300 which may detect a user's touch via the touch panel 320 may be easily formed.

Detailed aspects of the touch panel 320 and the touch circuit film portion 330A are the same as or similar to the touch panel 120 and the touch circuit film portion 130 illustrated in FIGS. 1 through 7, and thus, their descriptions will be omitted.

Detailed aspects of the display circuit film portion 330 and the display panel 310 are the same as or similar to the display circuit film portion 230 and the display panel 210 of the embodiment described by referring to FIGS. 8 through 10, and thus, their descriptions will be omitted.

That is, although not illustrated, a conductive connecting member (not shown) connecting the touch pattern (not shown) of the touch panel 320 and a conductive pattern (not shown) included in the touch circuit film portion 330A may be formed, and the conductive connecting member may be disposed in a via-region (not shown). However, these aspects will not be described in detail.

Also, a conductive connecting member (not shown) connecting the display device (not shown) of the display panel 310 and a conductive pattern (not shown) included in the display circuit film portion 330B may be formed, and the conductive connecting member may be disposed in a via-area (not shown). However, these aspects will not be described in detail.

In some embodiments, a covering member 340 may be disposed above the touch panel 320, that is, to face a surface of the touch panel 320, which is opposite to a surface of the touch panel 320, which faces the display panel 310. Aspects of the covering member 340 are the same as the above-described embodiments.

In some embodiments, a first bonding member 341 may be disposed between the covering member 340 and the touch panel 320. In some embodiments, a polarized light member 342 may be further disposed between the display panel 310 and the touch panel 320. In some embodiments, a second bonding member 343 may be disposed between the polarized light member 342 and the touch circuit film portion 330A.

In the display apparatus 300 according to the present embodiment, the touch circuit film portion 330A may be disposed on a surface of the touch panel 320, that is, below the touch panel 320, and the conductive pattern may be formed in the touch circuit film portion 330A to overlap the touch pattern so that effective areas for the touch pattern may be increased in the touch panel 320 and the dead space on the touch panel 320 may be minimized.

Accordingly, there may be no need to form an additional black matrix for the touch panel 320 or an area of the black matrix for the touch panel 320 may be minimized.

Accordingly, the precision of a touch function of the touch panel 320 of the display apparatus 300 may be improved. Also, light prevention and intervention through the additional black matrix for the touch panel 320 may be minimized, thereby improving image quality of the display apparatus 300.

Also, according to the display apparatus 300 according to the present embodiment, the routing line for the conductor included in the display device of the display panel 310 or the circuit pattern for driving the display device may be easily formed. In particular, the display circuit film portion 330B may be disposed below the display panel 310, that is, on a surface of the display panel 310, which is not a surface facing a user, and the conductive pattern may be formed in the display circuit film portion 330B to overlap the conductor of the display device. Accordingly, display areas of the display panel 310 for the display device may be increased and the dead space on the display panel 310 may be minimized.

Accordingly, there may be no need to form an additional black matrix for the display panel 310 or an area of the black matrix for the display panel 310 may be minimized.

Accordingly, display areas of the display apparatus 300 may be increased, thereby improving image quality of the display apparatus 300.

As described above, according to the one or more of the above exemplary embodiments, the display apparatus may easily improve image quality. Also, the display apparatus may improve characteristics of the display apparatus even though a use of black matrix is minimized or omitted.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A display apparatus, comprising:
   a display panel comprising a substrate and one or more display devices which are disposed on the substrate and generate visible light, the substrate having a first via-area penetrating the substrate;
   a display circuit film portion that is disposed such that the display circuit film portion overlaps the one or more display devices and faces a surface of the display panel, which is opposite to a surface of the display panel, on which the visible rays are realized on a user side, and comprises a base film portion and one or more conductive patterns contacting the base film portion, the substrate of the display panel disposed between the display devices and the one or more conductive patterns; and
   a first conductive connecting member that is disposed in the first via-area of the substrate of the display panel to connect the one or more conductive patterns of the display circuit film portion to the one or more display devices,
   wherein:
   the display device of the display panel includes wirings and electrodes, all wirings and electrodes of the display device being arranged on a top of the substrate;
   the substrate is disposed between all of the wirings of the display device and the conductive patterns, and the substrate is disposed between all of the electrodes of the display device and the conductive patterns; and
   the substrate directly contacts the base film and the conductive patterns.

2. The display apparatus of claim 1, wherein the one or more conductive patterns are circuit patterns for driving the one or more display devices or a routing line corresponding to a conductor comprised in the one or more display devices.

3. The display apparatus of claim 1, wherein the one or more conductive patterns are formed on a surface of the base film portion of the display circuit film portion, the surface of the base film portion of the display circuit film portion facing the display panel.

4. The display apparatus of claim 1, wherein the first via-area is formed in the display panel.

5. The display apparatus of claim 1, wherein the first via-area is formed such that the first via-area penetrates the base film portion of the display circuit film portion.

6. The display apparatus of claim 1, wherein the first via-area is formed such that the first via-area has a length corresponding to a partial thickness of the base film portion of the display circuit film portion.

7. The display apparatus of claim 6, wherein the one or more conductive patterns are disposed in the base film portion.

8. The display apparatus of claim 1, further comprising a touch panel that is disposed above the display panel and comprises a touch pattern for detecting a touch input from a user.

9. The display apparatus of claim 8, further comprising:
   a touch circuit film portion that is disposed between the touch panel and the display panel, overlaps the touch pattern, and comprises a base film portion and one or more conductive patterns contacting the base film portion; and
   a second conductive connecting member that is disposed in a second via-area to connect the one or more conductive patterns of the touch circuit film portion and the touch pattern.

10. The display apparatus of claim 9, wherein the one or more conductive patterns of the touch circuit film portion are circuit patterns for driving the touch panel or a routing line corresponding to the touch pattern.

11. The display apparatus of claim 9, wherein the one or more conductive patterns of the touch circuit film portion are formed on a surface of the base film portion of the touch circuit film portion, the surface of the base film portion of the touch circuit film portion facing the display panel.

12. The display apparatus of claim 9, wherein the second via-area is formed in the touch panel.

13. The display apparatus of claim 9, wherein the touch panel comprises a touch substrate, the touch pattern is formed on the touch substrate, and the second via-area is formed such that the second via-area penetrates the touch substrate.

14. The display apparatus of claim 9, wherein the second via-area is formed such that the second via-area penetrates the base film portion of the touch circuit film portion.

15. The display apparatus of claim 9, wherein the second via-area is formed such that the second via-area has a length corresponding to a partial thickness of the base film portion of the touch circuit film portion.

16. The display apparatus of claim 9, wherein the one or more conductive patterns of the touch circuit film portion are disposed in the base film portion of the touch circuit film portion.

* * * * *